(12) United States Patent
Marksteiner et al.

(10) Patent No.: US 7,239,729 B2
(45) Date of Patent: Jul. 3, 2007

(54) CIRCUIT ARRANGEMENT AND METHOD FOR OPERATING A FINGERPRINT SENSOR

(75) Inventors: Stephan Marksteiner, Neubiberg (DE); Paul-Werner von Basse, Wolfratshausen (DE)

(73) Assignee: Siemens Aktiengesellschaft, Munich (DE)

( * ) Notice: Subject to any disclaimer, the term of this patent is extended or adjusted under 35 U.S.C. 154(b) by 754 days.

(21) Appl. No.: 10/203,220

(22) PCT Filed: Feb. 7, 2001

(86) PCT No.: PCT/DE01/00475

§ 371 (c)(1),
(2), (4) Date: Aug. 6, 2002

(87) PCT Pub. No.: WO01/59693

PCT Pub. Date: Aug. 16, 2001

(65) Prior Publication Data
US 2003/0002721 A1 Jan. 2, 2003

(30) Foreign Application Priority Data
Feb. 9, 2000 (DE) .............................. 100 05 617

(51) Int. Cl.
*G06K 9/00* (2006.01)

(52) U.S. Cl. ...................................... 382/124; 382/319

(58) Field of Classification Search ................ 382/124, 382/319
See application file for complete search history.

(56) References Cited

U.S. PATENT DOCUMENTS

| | | | | |
|---|---|---|---|---|
| 4,156,230 A | * | 5/1979 | Riganati et al. | 382/124 |
| 4,872,203 A | * | 10/1989 | Asai et al. | 383/4 |
| 4,924,509 A | * | 5/1990 | Yokomizo | 382/270 |
| 5,995,640 A | * | 11/1999 | Bolle et al. | 382/124 |
| 6,330,345 B1 | * | 12/2001 | Russo et al. | 382/115 |
| 6,483,932 B1 | * | 11/2002 | Martinez et al. | 382/124 |
| 6,741,729 B2 | * | 5/2004 | Bjorn et al. | 382/124 |

\* cited by examiner

*Primary Examiner*—Bhavesh M Mehta
*Assistant Examiner*—Jordan Kuhn
(74) *Attorney, Agent, or Firm*—Bell, Boyd & Lloyd LLP

(57) ABSTRACT

A circuit and method are provided for ensuring that a fingerprint sensor is started automatically when a finger is rested thereon such that a sufficiently contrasting image can be produced. A difference between a maximum and a minimum value of the sensor signals is generated wherein, if the difference is sufficiently large, indicating a sufficient contrast of an image to be produced, a normal scanning operation of the fingerprint sensor is initiated, thus ensuring that the complete fingerprint image is produced, a normal scanning operation of the fingerprint sensor is initiated, thus ensuring that the complete fingerprint images produced are of satisfactory quality.

4 Claims, 1 Drawing Sheet

CIRCUIT ARRANGEMENT AND METHOD FOR OPERATING A FINGERPRINT SENSOR

BACKGROUND OF THE INVENTION

In the case of a fingerprint sensor, a raster-shaped arrangement of individual sensor elements that are assigned to the points of the image to be detected is usually present in one plane, and electronic circuit components for determining a signal are connected thereto. The individual sensor elements that are set up for capacitive measurement, for example, are driven in series. This can be done by row or column in the case of a rectangular raster and, thus, of a matrix-like arrangement of the pixels. To date, a fingerprint sensor is always started anew and delivers a complete fingerprint image after each start. This is done independently of how rich in contrast the image produced turns out to be. In particular, fingerprint images are also supplied whenever the finger is not yet correctly resting on the support surface of the sensor. It would be desirable, on the other hand, for it to be possible to operate the sensor in a fashion ensuring that complete fingerprint images are delivered only whenever a finger rests on the support surface such that a clear and contrasty image can be produced.

It is an object of the present invention to determine how a fingerprint sensor can be used to always produce sufficiently contrasty images when a finger is rested thereon.

SUMMARY OF THE INVENTION

The circuit according to the present invention, or the operating method according to the present invention, ensure for a fingerprint sensor that the fingerprint sensor is started automatically when a finger is rested thereon in such a way that a sufficiently contrasting image can be produced. This is achieved by virtue of the fact that test runs are carried out whereby only a portion of the pixels is taken into account, and the sensor signals determined are used to establish whether it is possible to achieve a sufficient contrast. The circuit according to the present invention generates for this purpose the difference between a maximum and a minimum value of the sensor signals; for example, along a column or a row of a matrix-like arrangement of pixels. If this difference is sufficiently large, which indicates a sufficient contrast of an image to be produced, the normal scanning operation of the fingerprint sensor with the aid of which complete fingerprint images are produced is started. This ensures that the complete fingerprint images produced are of satisfactory quality.

The method according to the present invention therefore provides for determining contrasts within a previously selected group of pixels, and to initiate the production of a complete fingerprint image in the event of sufficient contrast.

A more precise description of an exemplary embodiment of the circuit and method is given below with the aid of the attached drawings.

Additional features and advantages of the present invention are described in, and will be apparent from, the following Detailed Description of the Invention and the Figures.

DETAILED DESCRIPTION OF THE INVENTION

Figure 1:
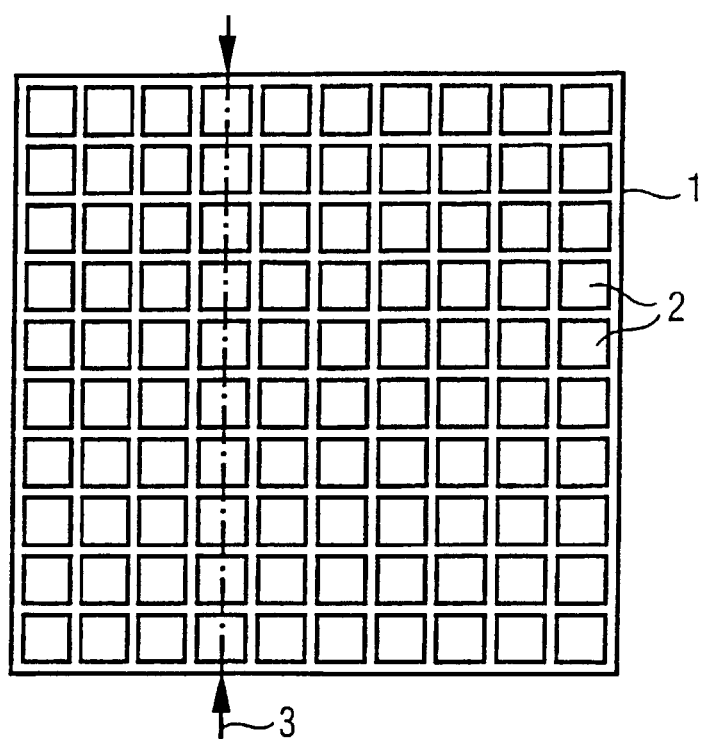
FIG. 1 shows in plan view a scheme of a matrix-like arrangement of sensor elements.

A raster-shaped arrangement in the scheme of a matrix is illustrated in FIG. 1 for the sensor elements of a fingerprint sensor. Sensor surfaces 2 for the individual pixels are located inside a region provided as support surface 1 for a finger. A column of pixels of this matrix is highlighted with a dashed line and two arrows 3. In a preferred exemplary embodiment of the circuit, or method, according to the present invention, the sensor signals of the sensor elements of such a column are determined in each case along this column in successive runs. The maximum and minimum values occurring in a run supply a measure of the achievable contrasts. If the difference between the maximum and minimum values overshoots a fixed value prescribed in accordance with the design of the fingerprint sensor and/or of the method, the driving of the sensor elements is modified such that it is no longer only signals of individual columns that are generated, but also an entire fingerprint image.

The individual sensor signals of the pixels respectively evaluated in this form are generated in the same way as in the case of the taking of the entire fingerprint image. The sequence of the drive is modified in accordance with the present invention by comparison with the sequence in the case of the taking of an entire image such that in each case only the pixels of a row, column, diagonal or similar selected group of pixels are detected, and their sensor signals are evaluated. Disregarding this additionally prescribable driving sequence, the drive circuit provided for this purpose otherwise can be designed in the way known per se for fingerprint sensors.

Figure 2:
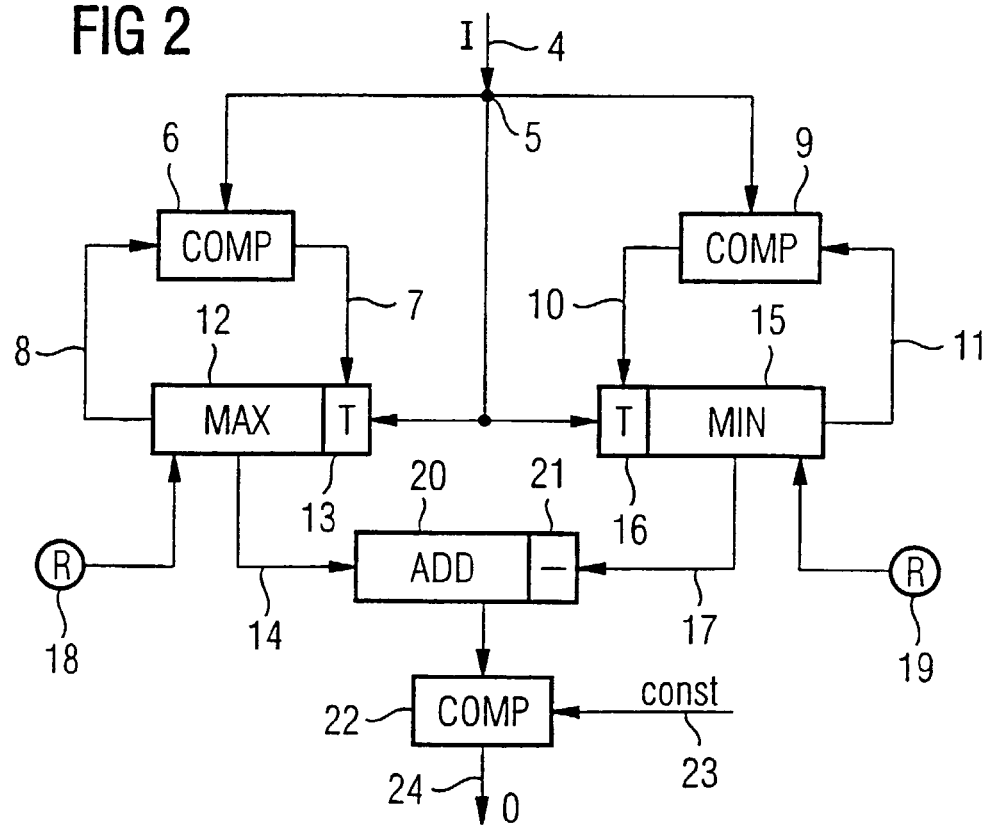
FIG. 2 shows a scheme for a circuit according to the present invention.

FIG. 2 shows a preferred embodiment of a circuit according to the present invention, with the aid of which the method according to the present invention can be executed. A sensor signal determined in each case in relation to the respective pixel passes to the input 4 of the circuit. Located there is a circuit node 5 with the aid of which the signal is supplied to two comparing elements 6, 9. It is established in each case in these comparing elements whether the current sensor signal is greater or smaller than the stored maximum or minimum value. These stored values are located in a first and second memory register 12, 15. The value stored there is fed via lines 8, 11 to the comparing elements and compared there with the current sensor signal. If it is established that the current sensor signal is, for example, greater than the stored maximum value, the first comparing element 6, which is illustrated on the left-hand side in the circuit diagram of FIG. 2, is used via an associated first control line 7, which leads to a first gate circuit 13, to accept the current signal, which is fed via the node 5 to the gate circuits 13, 16 that are present, into the first memory register 12. The second comparing element 9 correspondingly has a second control line 10 and a second gate circuit 16. The respective current minimum value is stored here.

Subsequent lines 14, 17 are used to supply the stored values to one subtracting element 20, 21 each, which can, as indicated in the drawing, for example, be an adding element upstream of which there is connected on the side of the second memory register 15 provided for the minimum value, a reversing element 21 for the sign. The difference that is produced in the subtracting element is supplied to a third comparing element 22 in which this difference is compared with a specific prescribed signal level 23. Output at the output 24 is a control signal with the aid of which the complete production of the fingerprint image is initiated, and the difference between the maximum and the minimum values overshoots the constantly prescribed value. Present for respective subsequent runs are circuit parts 18, 19 with the aid of which the contents of the memory registers are reset or erased. The minimum and maximum values are, thus, always respectively detected for only one run; that is to say, for exactly one interrogation of the sensor signals along a column or row in each case.

The evaluated pixels need not lie along a row but, for example, may lie in that region of the sensor surface in which the method according to the present invention supplies the best results. This can be a small section in the middle of a sensor surface. The method can be adapted to the respective circumstances and requirements by selecting the pixels to be detected according to the present invention.

Although the present invention has been described with reference to specific embodiments, those of skill in the art will recognize that changes may be made thereto without departing from the spirit and scope of the present invention as set forth in the hereafter appended claims.

The invention claimed is:

1. A circuit for operating a fingerprint sensor, comprising:
   a circuit portion for detecting sensor signals of individual pixels and for controlling a sequence in which the sensor signals are detected;
   a first comparing element for determining whether a supplied sensor signal is greater than a stored first value;
   a second comparing element for determining whether the supplied sensor signal is smaller than a stored second value;
   a first memory register for storing the first value;
   a second memory register for storing the second value;
   a first gate circuit for causing, if the supplied sensor signal has a larger value than a value stored in the first memory register, the larger value to be stored in the first memory register;
   a second gate circuit for causing, if the supplied sensor signal has a smaller value than a value stored in the second memory register, the smaller value to be stored in the second memory register;
   a subtracting element in which a difference between the values stored in the first and second memory registers is formed; and
   a third comparing element for comparing the difference with a prescribed value and for initiating production of a fingerprint image when the difference is greater than the prescribed value.

2. A method for operating a fingerprint sensor, the method comprising the steps of:
   generating a sensor signal for each pixel of a previously selected group of pixels;
   determining if each of the sensor signals are greater than a maximum value or smaller than a minimum value;
   repeating the steps of generating and determining in repeated runs, with account being taken in the step of determining only of values of a run just performed; and
   initiating production of a fingerprint image when a difference between the maximum and minimum values overshoots a prescribed value.

3. A method for operating a fingerprint sensor as claimed in claim 2, wherein the step of generating includes determining the sensor signals relating to the pixels in each case in a permanently prescribed sequence, wherein the step of determining includes storing a respective current maximum value and a respective current minimum value, and wherein each newly determined sensor signal is compared with the stored values and, upon undershooting or overshooting one of the stored values, the current sensor signal is stored so as to replace a respectively associated stored value.

4. A method for operating a fingerprint sensor as claimed in claim 3, wherein there are determined for a matrix-like arrangement of pixels the sensor signals relating to pixels of one of a row, a column and a diagonal in a sequence corresponding to the arrangement of the pixels in the respective row, column and diagonal.

\* \* \* \* \*